(12) United States Patent
Xie

(10) Patent No.: US 8,665,793 B2
(45) Date of Patent: Mar. 4, 2014

(54) METHOD AND SYSTEM FOR IMPLEMENTING SINGLE RADIO VOICE CALL CONTINUITY

(75) Inventor: Zhenhua Xie, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/258,025

(22) PCT Filed: Jul. 8, 2010

(86) PCT No.: PCT/CN2010/075065
§ 371 (c)(1),
(2), (4) Date: May 10, 2012

(87) PCT Pub. No.: WO2011/130954
PCT Pub. Date: Oct. 27, 2011

(65) Prior Publication Data
US 2013/0039267 A1    Feb. 14, 2013

(30) Foreign Application Priority Data

Apr. 21, 2010 (CN) .......................... 2010 1 0154326

(51) Int. Cl.
*H04W 4/00* (2009.01)
(52) U.S. Cl.
USPC .......................................... 370/328; 370/338
(58) Field of Classification Search
None
See application file for complete search history.

(56) References Cited

U.S. PATENT DOCUMENTS

| 8,165,090 B2* | 4/2012 | Nix ................................ 370/331 |
| 8,175,104 B2* | 5/2012 | Connelly et al. ............... 370/401 |
| 2009/0207757 A1* | 8/2009 | Andreasen et al. ........... 370/254 |
| 2009/0207759 A1* | 8/2009 | Andreasen et al. ........... 370/259 |
| 2009/0207823 A1* | 8/2009 | Andreasen et al. ........... 370/338 |
| 2011/0103266 A1* | 5/2011 | Andreasen et al. ........... 370/259 |
| 2011/0176531 A1* | 7/2011 | Rune et al. ..................... 370/338 |
| 2011/0286384 A1* | 11/2011 | Sugimoto et al. ............. 370/328 |

FOREIGN PATENT DOCUMENTS

| CN | 101227733 A | 7/2008 |
| CN | 101291454 A | 10/2008 |
| CN | 101291537 A | 10/2008 |
| CN | 101594647 A | 12/2009 |
| WO | 2008058877 A1 | 5/2008 |

OTHER PUBLICATIONS

International Search Report for PCT/CN2010/075065 dated Jan. 4, 2011.

* cited by examiner

*Primary Examiner* — Clemence Han
(74) *Attorney, Agent, or Firm* — Ling Wu; Stephen Yang; Ling and Yang Intellectual Property

(57) ABSTRACT

The present invention discloses a method and a system for implementing single radio voice call continuity (SRVCC), and said method includes: an ALG sending number information and/or identifier information if the ALG to a SCAS via a signaling message; said SCAS judging whether the number information and/or identifier information of the ALG are identical with the last used REFER number information or not, and if not, said SCAS notifying a PS or CS network control entity of the number information and/or identifier information of the ALG; alternatively, said SCAS notifying the PS or CS network control entity of the number and/or identifier information of the ALG. The present invention implements to dynamically select the ALG as a REFER operation entity to implement SRVCC, and solves the problem that a REFER request cannot be sent to an appropriate ALG since this ALG cannot be dynamically determined.

11 Claims, 7 Drawing Sheets

METHOD AND SYSTEM FOR IMPLEMENTING SINGLE RADIO VOICE CALL CONTINUITY

TECHNICAL FIELD

The present invention relates to the field of communications, and more especially, to a method and a system for implementing single radio voice call continuity in an Internet Protocol (IP) Multimedia Core Network Subsystem.

BACKGROUND OF THE RELATED ART

The IP Multimedia Core Network Subsystem (IMS) is an IP-based network architecture proposed by the $3^{rd}$ Generation Partnership Project (3GPP), and that builds an open and flexible service environment, supports multimedia applications, and is able to provide rich multimedia services for users.

In the IMS service architecture, the control layer and the service layer are separated, and the control layer only provides the necessary functions such as triggering, routing, charging and so on to the service layer other then providing specific services.

The service triggering and control function in the control layer is implemented by the Call Session Control Function (CSCF). The call session control function is divided into three types of Proxy-CSCF (P-CSCF), Interrogating-CSCF (I-CSCF) and Serving-CSCF (S-CSCF), wherein the S-CSCF takes the main responsibility, and the I-CSCF is optional.

The service layer is composed by a series of Application Servers (ASs) and that is able to provide specific service serving. The AS might be an individual entity or might also exist in the S-CSCF.

The control layer (S-CSCF) controls the service triggering according to the subscriber's subscription information, invokes the services in the ASs, and achieves the service function. The AS and the S-CSCF can be called as a Server Equipment (SE).

The IMS network also has the Application Layer Gateway (ALG, including the signaling processing entity and the media processing entity), which is the equipment implementing the interaction of control signaling and media among different networks. The media path between two session terminals is split by the ALG into two sections, wherein one section is an intra-network media path, that is, the media path between the ALG and the session terminal which is in the same network as the ALG, and the other section is an inter-network media path, that is, the media path between another session terminal and the ALG.

An end-to-end equipment in the session is called as a User Equipment (UE) which is responsible for interacting with the user, some UEs have multiple ways for accessing the network, including the way for accessing the network through the 3GPP Packet Switch (PS) domain, or through other non-3GPP PS domain, or even through the Circuit Switch (CS) domain, and so on.

If the CS network is configured with the enhanced Mobile Switch Center (eMSC), the eMSC provides the Session Initial Protocol (SIP) interface to interact with the IMS network, and then the interaction between the IMS network and the CS network is achieved by the eMSC.

For a UE with multiple access ways, if the UE can only use one access way at a certain moment, when it is executing a service, such as calling, in one access way, and when the UE moves to another place and it needs to change its used access way, the UE and the network can provide a certain way so that the service being executed by the UE is not interrupted, and such a capability is called as the single radio terminal voice call continuity, Single Radio Voice Call Continuity (SRVCC) for short.

FIG. 1A is a flow chart of a method for implementing the existing PS to CS SRVCC and describes the process about the UE-1 and UE-2 have established the IMS session, the session signaling passes through the ALG and the service continuity application server (SC AS) so as to establish the IMS media connection path; the media connection path passes through the ALG, and after the single radio voice call continuity happens to the UE-1, how the UE-1 and the network implement to let the UE-1 use the CS domain to establish a media connection and to maintain the original session continuity. The process comprises the following steps.

In step A101, the UE-1 accesses the PS network, the HSS or the HLR sends subscriber data including the REFER number information to a PS network control entity (such as the MME or the SGSN), and the UE-1 establishes a session with the UE-2 through the PS and IMS networks.

In step A102, the access network decides to let the UE-1 switch from the PS domain to the CS domain according to the signal intensity information in the measurement report of the UE-1, the PS network control entity (such as the MME or SGSN) sends a switch request to the eMSC, the eMSC prepares the CS resources for the UE-1, and afterwards, sends a switch response to the PS network control entity.

In step A103, after the eMSC receives the switch request, the eMSC sends a switch request to the ALG, such as sending an INVITE message which takes the number or identifier of the ALG as the target, or an Initial Address Message (IAM) which takes the number of the ALG as the target, wherein the number or identifier of the ALG might be pre-configured in the eMSC.

In step A104, the ALG receives the switch request, updates the media connection between the UE-1 and the ALG, such as sending a reINVITE message.

In step A105, the ALG sends the response message of the switch request to the eMSC, such as sending a "200 OK" message or an Answer Message (ANM).

In step A106, after receiving the response message in step A102, the PS network control entity indicates the UE-1 to switch from the PS domain to the CS domain.

After the switch, a CS media connection is established between the eMSC and the UE-1, and a new IMS Media Connection 3 is established between the eMSC and the ALG, the eMSC connects the CS Media connection with the newly established IMS media connection 3, and the ALG connects the newly established IMS media connection 3 with the original IMS media connection 2 so that the UE-1 can continue the call with the UE-2.

FIG. 1B is a flow chart of a method for implementing the existing CS to PS SRVCC and describes the process about the UE-1 and UE-2 have established the session through the CS and IMS networks, the session signaling passes the SC AS), and after the SRVCC happens to the UE-1, how the UE-1 and the network implement to let the UE-1 use the PS domain to establish a media connection and to maintain the original session continuity. The process comprises the following steps.

In step B101, the UE-1 accesses the CS network, the UE-1 establishes a session with the UE-2 through the CS network and the IMS network, and a CS media connection is established between the UE-1 and the CS network control entity, and the IMS media connection 1 is established between the CS network control entity and the UE-2.

In step B102, the access network decides to let the UE-1 switch from the CS domain to the PS domain according to the signal intensity information in the measurement report of the UE-1, the CS network control entity (such as the MSC Server) sends a switch request to the eMSC, and the eMSC sends a switch response to the CS network control entity.

Step B102 can be skipped if the CS network control entity implements the eMSC function.

In step B103, after the eMSC receives the switch request, the eMSC sends a REFER request to the ALG, such as sending a REFER message which takes the number or identifier of the ALG as the target, wherein the number or identifier of the ALG might be pre-configured in the eMSC.

In step B104, the ALG receives the REFER request, it sends a REFER request to the SC AS, such as sending an INVITE message including the media resource information of the ALG; after the SC AS receives the REFER request, it updates the remote end, such as sending a reINVITE message or an UPDATE message to the UE-2, after the SC AS receives the response message from the UE-2, it sends a REFER response to the ALG.

In step B105, the ALG sends the response message of the REFER request to the eMSC, such as sending a "200 OK" message.

In step B106, the CS network control entity receives a response message in step B102, and then instructs the UE-1 to switch from the CS domain to the PS domain.

In step B107, after the UE-1 switches to the PS domain, it initiates the REFER request to the SC AS, such as sending an INVITE message including the media resource information of the UE-1.

In step B108, the REFER request passes the ALG, and the ALG sends a response message including the media resource information of the ALG to the UE-1.

At this point, an IMS media connection 2 is established between the ALG and the UE-1, and a new IMS Media Connection 3 is established between the UE-2 and the ALG, the ALG connects the IMS Media connection 2 with the newly established IMS media connection 3 so that the UE-1 can continue the call with the UE-2.

The ALG might be an entity dynamically allocated in the session establishment process, and the problem about how the eMSC dynamically determines the ALG so as to send a REFER request to the appropriate ALG in the aforementioned existing single radio voice call continuity process is not considered.

SUMMARY OF THE INVENTION

The embodiment of the present invention provides a method and a system for implementing single radio voice call continuity to solve the problem that the ALG used in the session cannot be dynamically determined.

A method for implementing single radio voice call continuity (SRVCC) comprises:

an ALG sending number information and/or identifier information of the ALG to a SC AS through a signaling message; and the SC AS judging whether the number information and/or identifier information of the ALG are the same as last used REFER number information or not, if not, the SC AS notifying a PS network control entity or a CS network control entity of the number information and/or identifier information of the ALG; alternatively the SC AS notifying the PS network control entity or the CS network control entity of the number information and/or identifier information of the ALG.

Said signaling message is a call request, a call response, or a register request.

The step of the SC AS notifying the PS network control entity or the CS network control entity of the number information and/or the identifier information of the ALG comprises:

the SC AS using the number information and/or identifier information of the ALG to update REFER number information in a HSS or a HLR; and the HSS or HLR sending the updated REFER number information to the PS network control entity or the CS network control entity.

When switch occurring, if the CS network control entity is not an enhanced MSC (eMSC), the method further comprises: said CS network control entity sending the number information of the ALG to the eMSC.

The REFER number information is a part of the subscriber number information in the HSS or the HLR, the step of the SC AS using the number information of the ALG to update the REFER number information in the HSS or the HLR comprises:

the SC AS updating the REFER number information in the HSS or the HLR by updating the subscriber number information in the HSS or the HLR.

The step of notifying the PS network control entity or the CS network control entity of the number information and/or identifier information of the ALG comprises:

the SC AS making a request for acquiring a serving subscriber related access point information in a session, and the access point information including the identifier information of the PS network control entity or the CS network control entity; and the SC AS sending an update message to the PS network control entity or the CS network control entity according to said identifier information, and carrying the number information and/or identifier information of the ALG in the update message.

The present invention further provides a system for implementing single radio voice call continuity, comprising an ALG and a SC AS; wherein the ALG is configured to: send number information and/or identifier information of the ALG to the SC AS through a signaling message;

the SC AS is configured to: notify a packet switch (PS) or circuit switch (CS) network control entity of the number information and/or identifier information of the ALG.

The signaling message is a call request, a call response, or a register request.

The SC AS is configured to: judge whether the number information of the ALG is the same as the last used REFER number or not, and if a judgment result is not, the SC AS sends the number information of the ALG to the PS or CS network control entity.

The SC AS is configured to: use the number information and/or identifier information of the ALG to update REFER number information in a HSS or a HLR, so as to send the updated REFER number information to the PS network control entity or the CS network control entity through the HSS or the HLR.

Said REFER number information is a part of subscriber number information in the HSS or the HLR, the SC AS is also configured to: update the REFER number information in the HSS or the HLR by updating subscriber number information in the HSS or the HLR.

The SC AS is configured to: make a request for acquiring a serving subscriber related access point information in a session from a HSS or a HLR, and the access point information includes identifier information of the PS or CS network control entity; and send an update message to the PS or CS network control entity according to said identifier information, and the update message carries the number information and/or identifier information of the ALG.

The present invention provides a method and a system for implementing single radio voice call continuity, the ALG sends the number information of the ALG to the SC AS through a signaling message, the SC AS judges whether the number information and/or identifier information of the ALG are the same as the last used REFER number information or not, if not, the SC AS notifies the PS or CS network control entity of the number information or identifier information of the ALG, or notifies the PS or CS network control entity of the number information or identifier information of the ALG so as to dynamically select an ALG to act as the REFER operation entity to fulfill the SRVCC, which solve the problem that the ALG cannot be dynamically determined so that the REFER request cannot be sent to the appropriate ALG.

PREFERRED EMBODIMENTS OF THE PRESENT INVENTION

The ALG might be an entity dynamically allocated in the session establishment process, the problem about how the eMSC dynamically determines the ALG so that the REFER request can be sent to the ALG is not considered in the existing single standby switch process. In addition, the single radio voice call continuity can be implemented by the ALG via fixedly storing the number of the ALG into the eMSC, but in this case, all sessions must be anchored to the same ALG, and the load of the ALG cannot be shared.

In order to solve the aforementioned problem, the embodiment of the present invention provides a method for implementing single radio voice call continuity to further illustrate the embodiment of the present invention with combination of the accompanying drawings.

Figure 2:
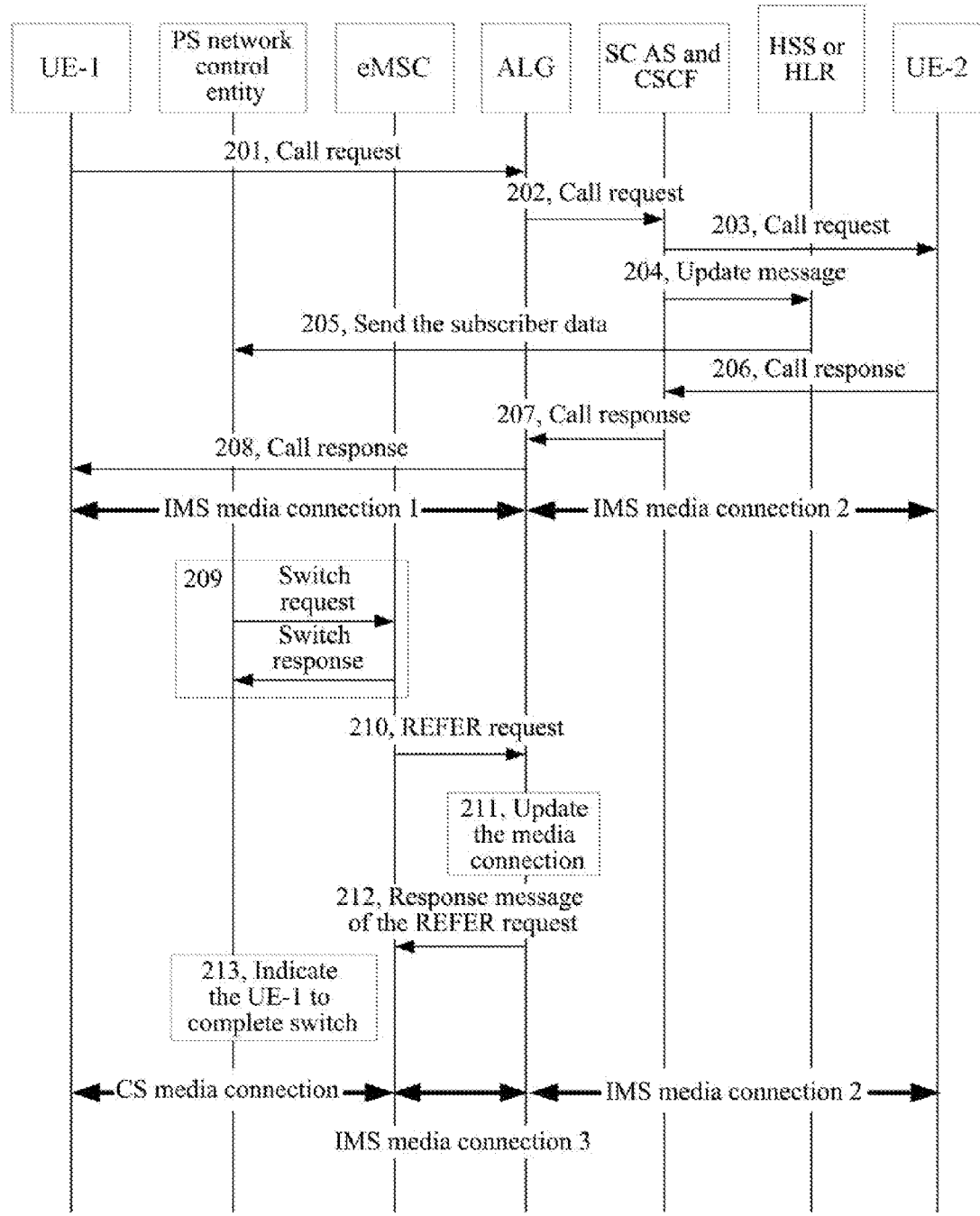
FIG. 2 is a flow chart of a method for implementing the PS to CS single radio voice call continuity provided in the embodiment 1 of the present invention.

FIG. 2 is a flow chart of a method for implementing PS to CS single radio voice call continuity provided in the embodiment 1 of the present invention and describes the process about the UE-1 and UE-2 have established the IMS session, the session signaling passes through the ALG and the SC AS so as to establish an IMS media connection path, the media connection path passes through the ALG, and in the session establishment process, the ALG sends the number information and/or identifier information of the ALG to the SC AS via the signaling message, after the PS to CS single radio voice call continuity happens to the UE-1, how does the eMSC determine the ALG. The UE-1 works as the calling party to initiate a call to the UE-2 in the embodiment of the present invention, the process comprises the following steps.

In step 201, after the UE-1 accesses the PS network, it calls the UE-2 through the IMS network, and sends a call request to the ALG.

In the embodiment of the present invention, the call request works as the signaling message, specifically, this step is achieved by sending an INVITE message.

In step 202, the call request passes through the ALG, and the ALG forwards the call request, the call request passes through the CSCF and reaches to the SC AS.

In this step, the ALG carries the number information and/or identifier information of the ALG in the forwarded call request.

In step 203, the SC AS forwards the call request to the UE-2 through the CSCF.

In step 204, at the same time of step 203, the SC AS might judge whether the number information and/or identifier information of the ALG in the step 203 are the same as the last used REFER number information or not (for example, if this is the UE-1's first call, the SC AS judges whether the number information and/or identifier information of the ALG are the same as the REFER number information or not by acquiring the REFER number from the HSS, otherwise, the SC AS can judge whether the number information and/or identifier information of the ALG are the same as the REFER number used in the last session or not), the SC AS can send an update message to the HLR or the HSS if the judgment result is not the same, and update the REFER number information.

Optionally, in this step, the SC AS also might not perform judgment, but directly sends the update message to the HLR or the HSS.

In step 205, the HLR or the HSS receives the update message, and knows that the subscriber data has changed, updates the REFER number information as the received number information and/or identifier information of the ALG, sends the subscriber data to the PS network control entity (SGSN or MME), specifically, sends the subscriber data through the Insert Subscriber Data message, and the subscriber data includes the updated REFER number information.

In step 206, the UE-2 receives the call request, responds the call request and sends a call response, such as sending the "200 OK" message.

In step 207, the response message reaches the SC AS via the CSCF, and the SC AS forwards the response message to the ALG.

In step 208, the ALG receives the call response and forwards the call response to the UE-1.

Figure 1A:
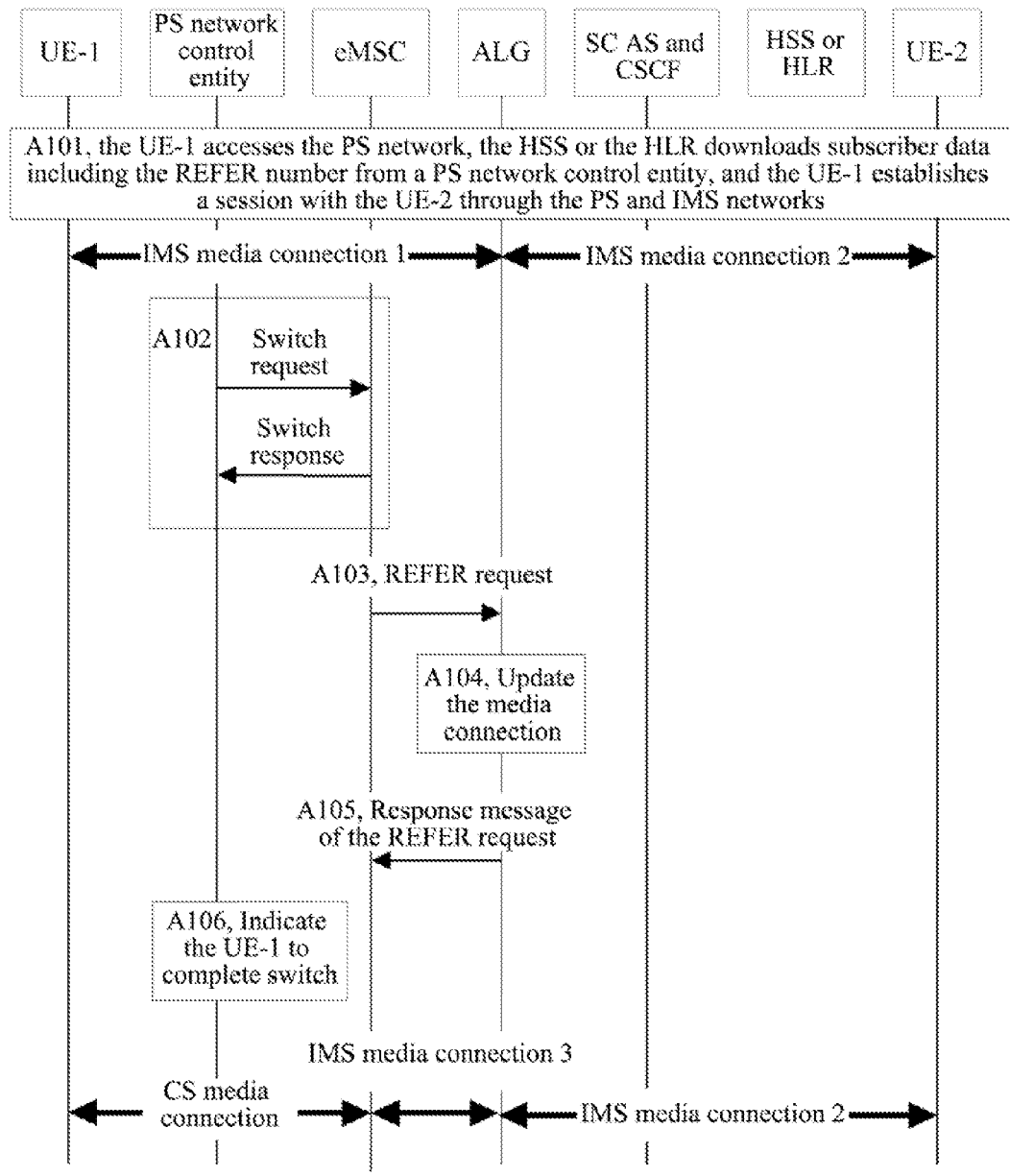
FIG. 1A is a flow chart of a method for implementing the PS to CS single radio voice call continuity in the related art.

Steps 209~210 are the same as steps A102~A103 in the FIG. 1A, the REFER number information included in the step 210 is the number information and/or identifier information of the ALG.

Steps 211 to 213 are the same as steps A104 to A106 in FIG. 1A and are not discussed here anymore.

The embodiment 2 of the present invention will be described in the following with combination of the accompanying drawings.

Figure 3:
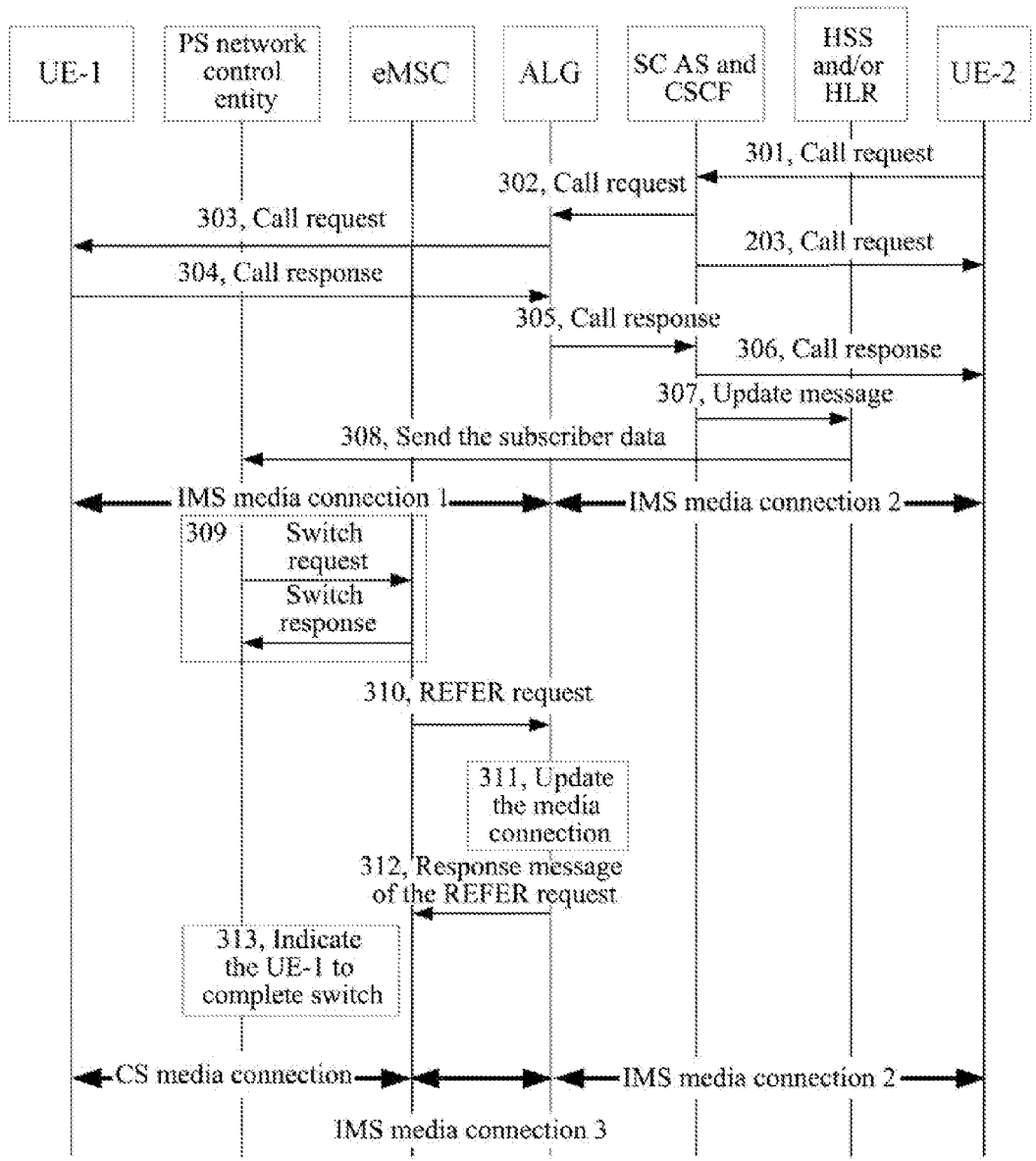
FIG. 3 is a flow chart of a method for implementing the PS to CS single radio voice call continuity provided in the embodiment 2 of the present invention.

FIG. 3 is a flow chart of a method for implementing a PS to CS single radio voice call continuity provided in the embodiment 2 of the present invention and describes the process about the UE-1 and UE-2 have established the IMS session, the session signaling passes through the ALG and the SC AS, so as to establish the IMS media connection path, the media connection path passes through the ALG, in the session establishment process, the ALG sends the number information and/or identifier information of the ALG to the SC AS through the signaling message, and after the PS to CS single radio voice call continuity happens to the UE-1, how does the eMSC determine the ALG. The process comprises the following steps.

In step 301, the UE-1 accesses the PS network, the UE-2 calls the UE-1 through the IMS network, and first sends a call request to the SC AS, such as sending an INVITE message.

In step 302, the call request reaches the SC AS via the CSCF, and the SC AS forwards the call request to the ALG via the CSCF.

In step 303, the call request passes through the ALG, and the ALG forwards the call request to the UE-1.

In step 304, the UE-1 receives the call request and sends the call response to the ALG, such as sending a "200 OK" message.

In the embodiment of the present invention, the call response is a signaling message.

In Step 305, the ALG receives the call response, forwards the call response, and carries the number information and/or identifier information of the ALG in the forwarded call response.

In step 306, the response message reaches the SC AS via the CSCF, and the SC AS forwards the response message to the UE-2 via the CSCF.

In step 307, at the same time of the step 305, the SC AS might judge whether the number information and/or identifier information of the ALG in the step 305 are the same as the last used REFER number or not, and if the judgment result is not the same or judgment is not performed, the SC AS sends an update message to the HLR or the HSS to update the REFER number information; or directly sends an update message to the HLR or HSS without the judgment.

In step 308, the HLR or the HSS receives the update message and knows that the subscriber data has changed, it updates the REFER number information as the received number information and/or identifier information of the ALG, and sends the subscriber data to the PS network control entity (SGSN or of MME), specifically, sends the subscriber data through the Insert Subscriber Data message, and the subscriber data includes the updated REFER number information (that is, the number Information and/or identifier information of the ALG).

When the eMSC judges that it needs to switch the UE-1 from the PS domain to the CS domain, it sends a switch request to the PS network control entity, and the PS network control entity forwards the request to the eMSC, and adds the REFER number information (that is, the number information and/or identifier information of the ALG) in the request, takes the ALG as the REFER operation entity, and the ALG completes the single radio video call continuity implementation process, the steps 309 to 313 in the specific operation process are the same as the process described in steps 209 to 213 in FIG. 2 and are not repeated here.

The embodiment 3 of the present invention will be described in the following with combination of the accompanying drawings.

Figure 4:
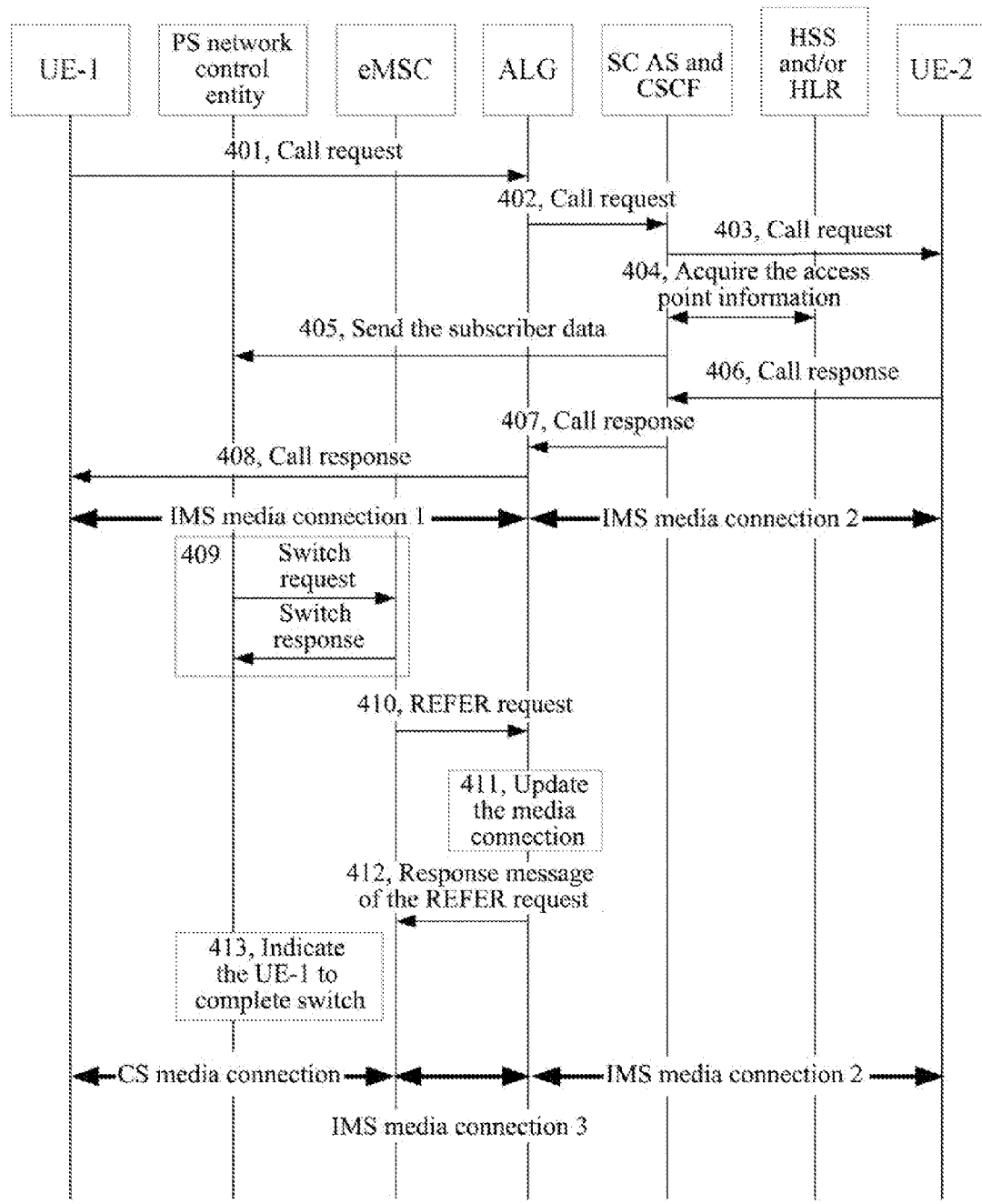
FIG. 4 is a flow chart of a method for implementing the PS to CS single radio voice call continuity provided in the embodiment 3 of the present invention.

FIG. 4 is a flow chart of a method for implementing a PS to CS single radio voice call continuity provided in the embodiment 3 of the present invention and describes the process about the UE-1 and UE-2 have established the IMS session, the session signaling passes through the ALG and the SC AS, so as to establish the IMS media connection path, the media connection path passes through the ALG, in the session establishment process, the ALG sends the number information and/or identifier information of the ALG to the SC AS through the signaling message, and after the PS to CS single radio voice call continuity happens to the UE-1, how does the eMSC determine the ALG. The process comprises the following steps, wherein steps 401 to 403 are the same as the steps 201 to 203 in FIG. 2.

In step 404, at the same time of the step 403, the SC AS can judge whether the number information and/or identifier information of the ALG in the step 403 are the same as the last used number or not, and if the judgment result is not the same, the SC AS sends a request to the HLR or the HSS to acquire the serving subscriber (that is, the UE-1) related access point information (such as the access point information of the UE-1), and for example, the SC AS sends a message for acquiring the subscriber data to the HLR or the HSS, and the HLR or the HSS returns the subscriber data to the SC AS, and the subscriber data includes the identifier information of the PS network control entity which the UE-1 accesses; optionally, the SC AS might not perform judgment but directly sends a request to the HLR or the HSS to acquire the serving subscriber related access point information.

In step 405, the SC AS sends an update message to the PS network control entity (SGSN or MME), and the updates subscriber REFER number information as the number information and/or identifier information of the ALG.

The UE-2 responds the UE-1's call request, media connections are established between the UE-1 and the ALG as well as between the UE-2 and the ALG respectively, and when the PS network control entity judges that it needs to switch the UE-1 from the PS domain to the CS domain, it sends a switch request to the eMSC, and adds the REFER number information (that is, the number information and/or identifier information of the ALG) into the request, takes the ALG as the REFER operation entity, and the ALG completes the single radio voice call continuity process, steps 406 to 413 in the specific operation process are the same as the process described by the steps 206 to 213 in FIG. 2 and are not discussed here.

The embodiment 4 of the present invention will be described in the following with combination of the accompanying drawings.

Figure 5:
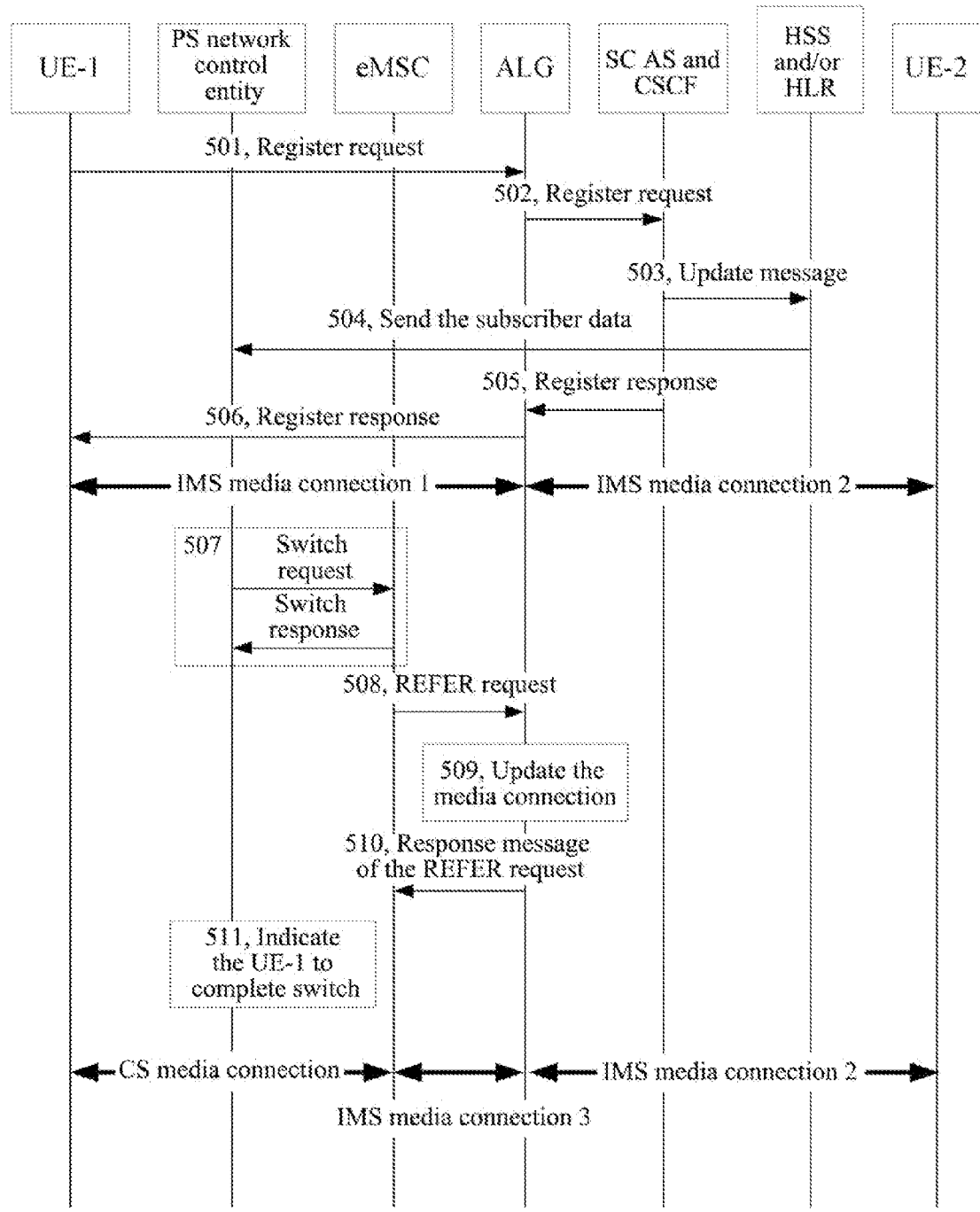
FIG. 5 is a flow chart of a method for implementing the PS to CS single radio voice call continuity provided in the embodiment 4 of the present invention.

FIG. 5 is a flow chart of a method for implementing a PS to CS single radio voice call continuity provided in the embodiment 4 of the present invention and describes the process about before the session is established, the ALG sends the number information and/or identifier information of the ALG to the SC AS through the signaling message and then the IMS session is established between the UE-1 and the UE-2, so as to establish the IMS media connection path, the media connection path passes through the ALG, and after the PS to CS single radio voice call continuity happens to the UE-1, how does the eMSC determine the ALG. The process comprises the following steps.

In step 501, the UE-1 sends a register request to the S-CSCF through the IMS network before establishing a session via the IMS domain, and the register request passes through the ALG, for example, the ALG and the P-CSCF are combined physically, or the P-CSCF selects a certain ALG to route the signaling message.

In the embodiment of the present invention, the register request is taken as the signaling message, and specifically, the step is achieved by sending the REGISTER message.

In step 502, after the ALG receives the register request, it forwards the register request, the register request reaches the S-CSCF, and the S-CSCF sends the register request to the SC AS through the standard IMS process.

In this step, the ALG carries the number information and/or identifier information of the ALG in the forwarded register request.

In step 503, after the SC AS receives the register request, it can judge whether the number information and/or identifier information of the ALG in the step 502 are the same as the last used REFER number information or not (for example, if it is the UE-1's first register, the SC AS judges whether both are the same or not by acquiring the number information from the HSS, otherwise, the SC AS might judge whether the number information and/or identifier information are the same as the REFER number used in the last session or not), and if the judgment result is not the same, the SC AS sends an update message to the HLR or the HSS to update the REFER number information.

Optionally, in this step, the SC AS might directly send an update message to the HLR or HSS without the judgment.

In step 504, the HLR or the HSS receives the update message and knows that the subscriber data has changed, it updates the number information of the ALG as the received number information and/or identifier information of the ALG, and sends the subscriber data to the PS network control entity (SGSN or MME), specifically, sends the subscriber data through the Insert Subscriber Data message, and the subscriber data includes the updated ALG number information.

Steps 503 to 504 are the same as the steps 404 to 405 in FIG. 4.

In step 505, after the SC AS receives the register request from the S-CSCF, it sends a register response to the S-CSCF, and after the S-CSCF receives a register request from the UE-1, it sends a register response to the UE-1, such as sending a "200 OK" message.

In step 506, the register response passes through the ALG, and the ALG forwards the response to the UE-1.

The UE-1 establishes an IMS session with the UE-2 through the PS domain, the media connection path passes through the ALG, and then the following steps also are comprised.

Steps 507 to 511 are the same as steps 209 to 213 in FIG. 2.

The embodiment 5 of the present invention will be described in the following with combination of the accompanying drawings.

Figure 6:
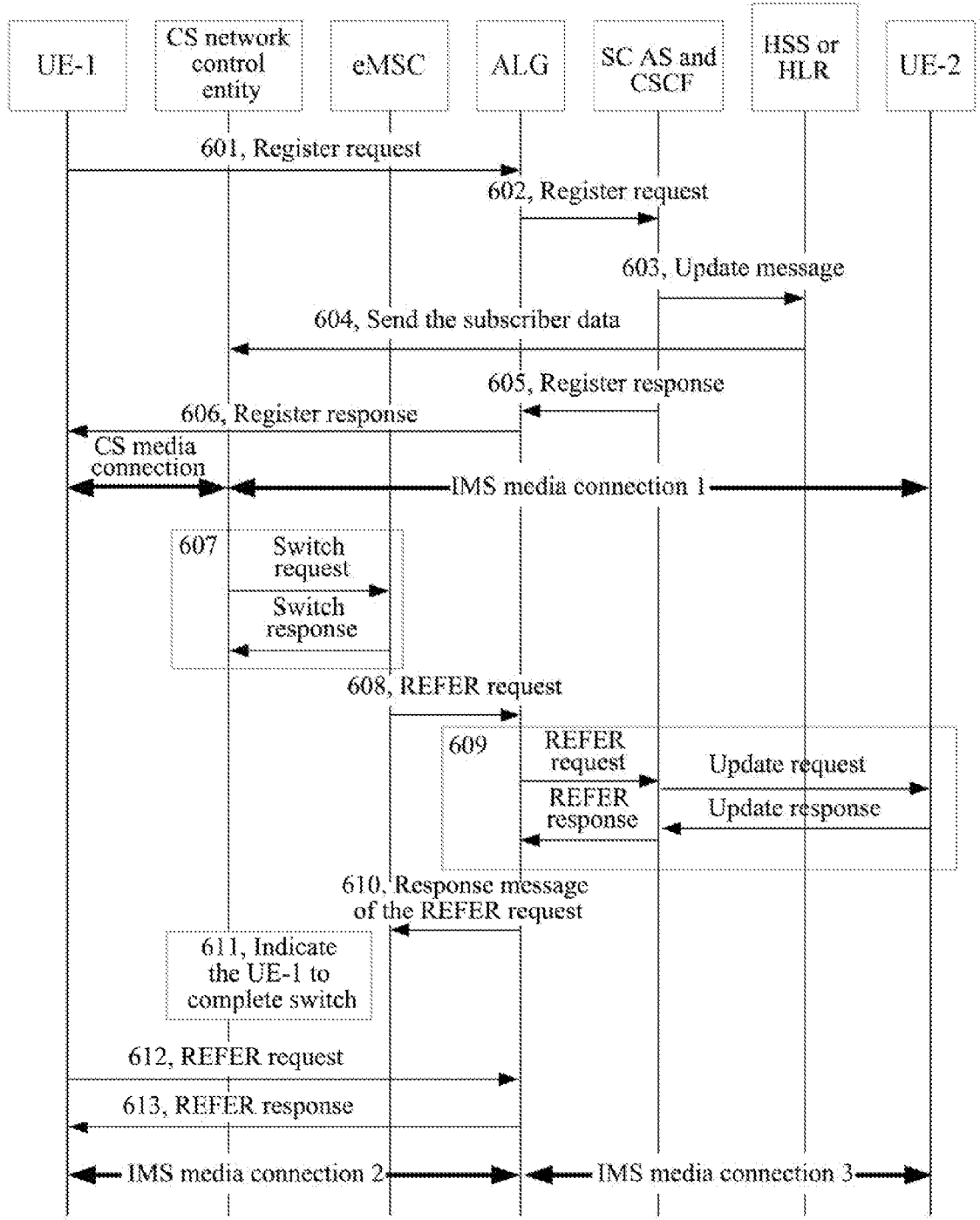
FIG. 6 is a flow chart of a method for implementing the CS to PS single radio voice call continuity provided in the embodiment 5 of the present invention.

FIG. 6 is a flow chart of a method for implementing a PS to CS single radio voice call continuity provided in the embodiment 5 of the present invention and describes the process about the UE-1 and UE-2 establish the session via the CS domain, the session signaling passes through the SC AS, before or in the session establishment process, the ALG sends the number information and/or identifier information of the ALG to the SC AS through the signaling message, and after the PS to CS single radio voice call continuity happens to the UE-1, how does the eMSC determine the ALG. The process comprises the following steps.

In step 601, the UE-1 sends a register request to the S-CSCF through the IMS network before establishing a session via the CS domain or in the establishment process, and the register request passes through the ALG, for example, the ALG and the P-CSCF are combined physically, or the P-CSCF selects a certain ALG to route the signaling message.

In the embodiment of the present invention, the register request is taken as the signaling message, and specifically, the step is achieved by sending the REGISTER message.

In step 602, after the ALG receives the register request, it forwards the register request, the register request reaches the S-CSCF, and the S-CSCF sends the register request to the SC AS through the standard IMS process.

In this step, the ALG carries the number information and/or identifier information of the ALG in the forwarded register request.

In step 603, after the SC AS receives the register request, the SC AS can judge whether the number information and/or identifier information of the ALG in the step 602 are the same as the last used REFER number information or not (for example, if it is the UE-1's first register, the SC AS judges whether both are the same or not by acquiring the number information from the HSS, otherwise, the SC AS might judge whether the number information and/or identifier information are the same as the REFER number used in the last session or not), and if the judgment result is not the same, the SC AS sends an update message to the HLR or the HSS to update the REFER number information.

Optionally, in this step, the SC AS might directly send an update message to the HLR or HSS without the judgment.

In this step, the SC AS might take the REFER number information as a part of the subscriber number information, such as a prefix or suffix, and then update the subscriber number information in the HSS or the HLR.

In step 604, the HLR or the HSS receives the update message and knows that the subscriber data has changed, it updates the number information of the ALG as the received number information and/or identifier information of the ALG, and sends the subscriber data to the CS network control entity (MSC), specifically, sends the subscriber data through the Insert Subscriber Data message, and the subscriber data includes the updated number information of the ALG.

Steps 603 to 604 are the same as the steps 404 to 405 in FIG. 4; the only difference is that it is the identifier information of the CS network control entity acquired by the SC AS from the HSS or the HLR, thereby sending the update message to the CS network control entity.

In step 605, after the SC AS receives the register request from the S-CSCF, it sends a register response to the S-CSCF, and after the S-CSCF receives a register request from the UE-1, it sends a register response to the UE-1, such as sending a "200 OK" message.

In step 606, the register response passes through the ALG, and the ALG forwards the response to the UE-1.

The session is established between the UE-1 and the UE-2, the session media path is composed of the CS media connection between the UE-1 and the CS network control entity (MSC) and the IMS media connection 1 between the CS network control entity and the UE-2, and then the subsequent process also comprises the following steps.

In step 607, according to the signal intensity information in the UE-1's measurement report, the access network determines to switch the UE-1 from the CS domain to the PS domain, the CS network control entity (such as the MSC Server) sends a switch request to the eMSC, and the switch request carries the number information and/or identifier information of the ALG, the number information or identifier information of the ALG might be used as a part of the subscriber number information (such as a prefix), and the eMSC sends a switch response to the CS network control entity.

If the CS network control entity achieves the eMSC function, the step 607 might not be necessary.

In step 608, after the eMSC receives the REFER request, the eMSC sends a REFER request to the ALG, such as sending the REFER message which takes the number or identifier of the ALG as the target, and the number or identifier of the ALG is acquired through the step 607.

Figure 1B:
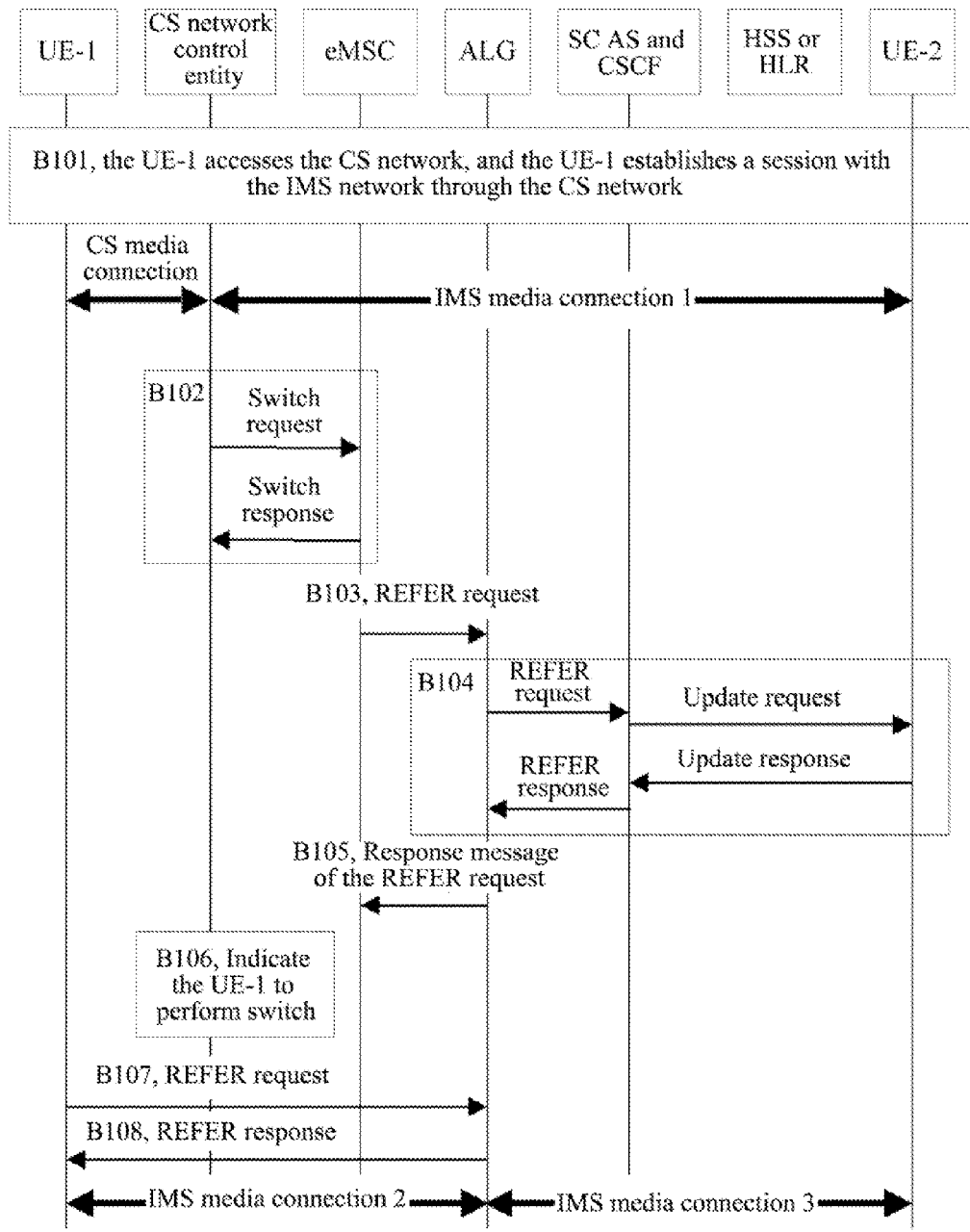
FIG. 1B is a flow chart of a method for implementing the CS to PS single radio voice call continuity in the related art.

Steps 609-612 are the same as steps B104-B108 in FIG. 1B.

The embodiment of the present invention also provides a system for implementing single radio voice call continuity, comprising the ALG and the SC AS.

The ALG is configured to: send the number information and/or identifier information of the ALG to the SC AS through the signaling message.

The SC AS is configured to: notify the PS or CS network control entity of the number information and/or identifier information of the ALG, indicate the PS or CS network control entity to determine the ALG implementing the SRVCC based on said number information and/or identifier information.

Furthermore, the signaling message is a call request, a call response, or a register request.

Furthermore, the SC AS is configured to: judge whether the number information and/or identifier information of the ALG are the same as the last used REFER number or not, and if the judgment result is not the same, the SC AS sends the number information of the ALG to the PS or CS network control entity.

Furthermore, the SC AS is configured to: use the number information and/or identifier information of the ALG to update the REFER number information in the HSS or HLR, so as to send the updated REFER number information to the PS or CS network control entity through the HSS or the HLR.

Furthermore, said REFER number information is a part of the subscriber number information in the HSS or the HLR, and the SC AS is also configured to: update the REFER number information in the HSS or the HLR by updating the subscriber number information in the HSS or the HLR.

Furthermore, the SC AS is configured to: make a request for acquiring the serving subscriber related access point information in the session from the HSS or the HLR, and the access point information includes the identifier information of the PS network control entity; and send an update message to the PS network control entity according to said identifier information, and the update message carries the number information and/or identifier information of the ALG.

The aforementioned system for implementing the SRVCC might be combined with the method for implementing the SRVCC provided in the embodiments of the present invention, the ALG sends the number information and/or identifier information of the ALG to the SC AS through the signaling message, after the judgment, the SC AS notifies the PS or CS network control entity of the number information and/or identifier information of the ALG, or directly sends the number information and/or identifier information of the ALG to the PS or CS network control entity to indicate the PS or CS network control entity determine the ALG implementing the SRVCC according to the number information and/or identifier information, which implements to dynamically select an ALG as the REFER operation entity to achieve the SRVCC, thus solving the problem that the ALG cannot be dynamically determined so that the REFER request cannot be sent to the appropriate ALG.

A person having ordinary skill in the art can understand that all or parts of the steps for implementing the aforementioned method embodiment can be implemented through the program instructing the related hardware, the program might be stored in a computer readable storage medium, and when the program is executed, one or any combination of the steps of method embodiments or is comprised.

In addition, the various functional units in the various embodiments of the present invention can be implemented in the form of the hardware or in the form of software function modules. When the integrated module is implemented in the form of software function modules and is used or sold as an individual product, it can also be stored in a computer readable storage media.

The aforementioned storage media might be a read-only memory, a disk or a CD-ROM and so on.

The above description is only the specific implementation of the present invention, but the protection scope of the present invention is not limited to the above description. Without departing from the technical range disclosed in the present invention, those skilled in the art can easily think of changes or replacements, all of which should be within the protection scope of the present invention. Therefore, the protection scope of the present invention should be based on the protection scope of the claims.

Industrial Applicability

The present invention provides a method and a system for implementing single radio voice call continuity to dynamically select the ALG as the REFER operation entity to implement the SRVCC, thus solving the problem that the ALG cannot be dynamically determined so that the REFER request cannot be sent to the appropriate ALG.

What is claimed is:

1. A method for implementing single radio voice call continuity (SRVCC), comprising:
   an application layer gateway (ALG) sending number information and/or identifier information of the ALG to a service continuity application server (SC AS) through a signaling message; and
   the SC AS judging whether the number information and/or identifier information of the ALG are the same as last used REFER number information or not, if not, the SC AS notifying a packet switch (PS) network control entity or a circuit switch (CS) network control entity of the number information and/or identifier information of the ALG; alternatively
   the SC AS notifying the PS network control entity or the CS network control entity of the number information and/or identifier information of the ALG.

2. The method of claim 1, wherein said signaling message is a call request, a call response, or a register request.

3. The method of claim 1, wherein the step of the SC AS notifying the PS network control entity or the CS network control entity of the number information and/or the identifier information of the ALG comprises:
   the SC AS using the number information and/or identifier information of the ALG to update REFER number information in a Home Subscriber Server (HSS) or a Home Location Register (HLR); and
   the HSS or HLR sending the updated REFER number information to the PS network control entity or the CS network control entity.

4. The method of claim 3, wherein the REFER number information is a part of the subscriber number information in the HSS or the HLR.

5. The method of claim 1, wherein the step of the SC AS notifying the PS network control entity or the CS network control entity of the number information and/or identifier information of the ALG comprises:
   the SC AS making a request for acquiring a serving subscriber related access point information in a session, and the access point information including identifier information of the PS network control entity or the CS network control entity; and
   the SC AS sending an update message to the PS network control entity or the CS network control entity according to said identifier information of the PS network control entity or the CS network control entity, and carrying the number information and/or identifier information of the ALG in the update message.

6. A system for implementing single radio voice call continuity, comprising an application layer gateway (ALG) and a service continuity application server (SC AS); wherein
the ALG is configured to: send number information and/or identifier information of the ALG to the SC AS through a signaling message;
the SC AS is configured to: notify a packet switch (PS) or circuit switch (CS) network control entity of the number information and/or identifier information of the ALG.

7. The system of claim 6, wherein the signaling message is a call request, a call response, or a register request.

8. The system of claim 6, wherein
the SC AS is configured to: judge whether the number information of the ALG is the same as the last used REFER number or not, and if a judgment result is not, the SC AS sends the number information of the ALG to the PS or CS network control entity.

9. The system of claim 6, wherein
the SC AS is configured to: use the number information and/or identifier information of the ALG to update REFER number information in a Home Subscriber Server (HSS) or a Home Location Register (HLR), so as to send the updated REFER number information to the PS network control entity or the CS network control entity through the HSS or the HLR.

10. The system of claim 9, wherein said REFER number information is a part of subscriber number information in the HSS or the HLR, the SC AS is also configured to:
update the REFER number information in the HSS or the HLR by updating subscriber number information in the HSS or the HLR.

11. The system of claim 6, wherein
the SC AS is configured to: make a request for acquiring a serving subscriber related access point information in a session from a Home Subscriber Server (HSS) or a Home Location Register (HLR), and the access point information includes identifier information of the PS or CS network control entity; and send an update message to the PS or CS network control entity according to said identifier information, and the update message carries the number information and/or identifier information of the ALG.

* * * * *